United States Patent Office 2,704,277
Patented Mar. 15, 1955

2,704,277

MINERAL OIL COMPOSITIONS CONTAINING ESTERIFIED COPOLYMERS OF ALPHA,-BETA-UNSATURATED POLYBASIC ACIDS WITH ALLYL AND VINYL ETHERS

John J. Giammaria, Woodbury, N. J., assignor to Socony-Vacuum Oil Company, Incorporated, a corporation of New York No Drawing. Application February 18, 1949, Serial No. 77,288

7 Claims. (Cl. 252—56)

This invention relates to new and improved lubricating oils. More particularly, the invention is concerned with the provision of oil-soluble products which, when added to lubricating oils, lower the pour points and/or improve the viscosity indices of said oils.

It is an object of this invention to provide a novel class of addition agents for lubricating oils. It is another object to provide lubricating oil compositions containing said novel addition agents, said compositions having substantially lower pour points and/or higher viscosity indices than exhibited by the oil alone. Other objects of the invention will be apparent from the following description thereof.

The present invention is predicated on the discovery that the products obtained by copolymerizing vinyl and/or allyl ethers with alpha,beta-unsaturated dicarboxylic acids or their anhydrides and thereafter esterifying the copolymers thus obtained with primary, normal, saturated aliphatic alcohols or mixtures of primary, normal, saturated aliphatic alcohols containing up to about eighteen carbon atoms per molecule, when added to lubricating oils in minor proportions, will lower the pour points and/or improve the viscosity indices of said oils.

Prior to this invention alpha,beta-unsaturated dicarboxylic acids, their anhydrides and their esters have been mentioned in the art as being copolymerizable with unsaturated compounds. However, insofar as is known it has never before been suggested that alpha,beta-unsaturated carboxylic acids or their anhydrides could be copolymerized with vinyl and/or allyl ethers and that the copolymers so formed could thereafter be esterified with relatively long chained, normal, saturated, aliphatic alcohols to yield oil-soluble products which could be added to lubricating oils to lower the pour points and/or improve the viscosity indices thereof.

The reaction products contemplated herein are prepared by copolymerizing (1) an allyl or a vinyl ether, or a mixture of such ethers, with (2) an alpha-, beta-unsaturated polybasic carboxylic acid material selected from the group consisting of maleic acid, fumaric acid, itaconic acid, glutaconic acid, mesaconic acid, citraconic acid, aconitic acid and the anhydrides of these acids and then esterifying the copolymer product with (3) a primary, normal, saturated, aliphatic alcohol. Where the ether reactant is of the allyl type a fourth reactant, which may be designated a vinyl monomer, may also advantageously be employed. This may be a vinyl ether or a vinyl ester such as vinyl acetate. Styrene may be also named as a preferred fourth reactant. Obviously, where the ether reactant is a vinyl ether, the fourth reactant may comprise an increased amount of the ether or it may be in the form of a different vinyl compound, such as an ester.

The ether material may be either chemically pure or a technical grade and may consist of either a single ether or a mixture of ethers of the vinyl or allyl type, or both. The ether may be derived from mono- or polyhydric alcohols of both the aliphatic and aromatic series. The allyl ethers may be conveniently prepared by reacting the sodium alcoholate with allyl bromide, while the vinyl ethers may be obtained by reacting the particular alcohol with acetylene in accordance with the well known Reppe process. Specific examples of suitable ethers are vinyl methyl ether, allyl methyl ether, vinyl octyl ether, allyl lauryl ether, allyl tetradecyl ether, vinyl octadecyl ether, vinyl or allyl phenyl ether, vinyl or allyl benzyl ether, divinyl or diallyl ethers and allyl or vinyl ethers of polyhydric alcohols, such as ethylene glycol. Methallyl type ethers may also be used.

The polycarboxylic acid material may consist of a single, chemically pure, alpha-, beta-unsaturated polycarboxylic acid, or it may consist of a single pure anhydride of such an acid. Also, it may be a mixture of such acids and anhydrides. In general, maleic anhydride and fumaric acid are preferred because of their ease of reaction and their availability. Substituted acids for anhydrides, such as chloromaleic, may also be successfully employed.

The normal aliphatic alcohol used for the final esterification may be either a single, chemically pure, primary, normal, saturated aliphatic alcohol, a technical grade of primary, normal, saturated aliphatic alcohol, or a mixture of chemically pure and/or technical grades of such alcohols. Suitable alcohols are those having from 1 to about 18 carbon atoms. However, alcohols of from about 10 to about 18 carbon atoms are preferred. Thus, the preferred alcohol reactant may be either a single alcohol having about 14 carbon atoms, such as lauryl or tetradecyl alcohol, or it may be a mixture of alcohols having an average of about 14 carbon atoms. Normal, aliphatic, saturated, monohydric alcohols are especially preferred. A technical grade of lauryl alcohol as sold by Eastman Kodak Company may be named as a preferred example. Typical of the alcohol mixtures which we have found very satisfactory are the commercial alcohol mixtures manufactured by E. I. du Pont de Nemours & Company. These alcohol mixtures contain normal, aliphatic, saturated, monohydric alcohols containing from 10 to 18 carbon atoms per molecule in approximately the following proportions:

|  | A | B |
|---|---|---|
| $C_{10}$ ----------percent-- | 2.5 | 2.8 |
| $C_{12}$ ----------do--- | 55.0 | 61.0 |
| $C_{14}$ ----------do--- | 20.5 | 21.0 |
| $C_{16}$ ----------do--- | 9.0 | 11.0 |
| $C_{18}$ ----------do--- | 13.0 | 2.2 |
| Ave. No. C Atoms | 13.5 | 12.7 |

The aforesaid alcohols are contemplated for use in the preparation of the ethers used herein, the alcohols having about 14 carbon atoms, such as lauryl and tetradecyl, and mixtures of alcohols, corresponding to composition A above, being particularly preferred.

My reaction products are obtained by first copolymerizing the ether with the alpha,beta-unsaturated polybasic acid material and then esterifying the copolymer product. The copolymerization is carried out by heating at temperatures of from about 50° C. to about 150° C. Although heat alone may be used, it is generally preferred to carry out the reaction in the presence of a small amount, i. e. from about 0.1% to about 5.0% of an organic peroxide, such as benzoyl peroxide, 1.0% being the amount generally employed. The reaction may be run in bulk or in the presence of a solvent, such as benzene, toluene, xylene, or dioxane. Since the reaction is exothermic in character, it is preferred to carry it out in about a 10 to 20% solution in order that it be suitably controlled.

The time of reaction varies with the temperature, reactivity of the monomers and the mode of polymerization, i. e. whether in bulk or in solution. Thus, reaction times of from a few minutes to about 30 hours may be used, although generally fifteen minutes to five hours is sufficient. In general, the proportions of reactants used may be varied from 1 mol of the acid material to about 4 mols of the ether, and vice versa; however, it is preferred to employ the reactants in equimolecular quantities.

The esterification of the copolymer products may be effected by any of the procedures well known to the art such as heating at xylene reflux in the presence of small amounts of concentrated $H_2SO_4$ or p-toluene sulfonic acid as a catalyst. Detailed procedures illustrating the preparation of the products contemplated herein are given in the following examples.

EXAMPLE I

*Copolymer of vinyl methyl ether with maleic anhydride-mixed alcohol ester thereof*

Twenty-nine grams of vinyl methyl ether, 49.0 grams of maleic anhydride, 1.0 gram of benzoyl peroxide and 250 cc. of dioxane were placed in a 0.5 liter stainless steel autoclave and heated at 100° C. for 3 hours. The copolymer which precipitated as a gummy resin was separated from the dioxane and dissolved in acetone. The solution was filtered and the copolymer reprecipitated by adding benzene. The precipitate was filtered off, washed with water and dried.

Five grams of the above copolymer, 20 grams of a mixture of alcohols of composition "A" set forth hereinabove, 0.3 gram of p-toluene sulfonic acid and 100 cc. of xylene were placed in a flask equipped with stirrer, thermometer and side-arm trap and condenser suitable for separating the water of esterification while permitting refluxing of the solvent. The mixture was heated at xylene reflux for about 3 hours or until no more water was condensed in the trap. The solution was filtered, followed by distillation of the solvent and any unreacted alcohol. The esterified copolymer was a very viscous liquid readily soluble in lubricating oil.

EXAMPLE II

*Copolymer of allyl methyl ether with maleic anhydride-mixed alcohol ester thereof*

Twenty-four grams of allyl methyl ether prepared from Eastman's allyl bromide and sodium methylate, 32.6 g. of maleic anhydride, 1.69 g. of benzoyl peroxide and 350 cc. of benzene were mixed and slowly heated to benzene reflux temperature (78° C.). After heating for four hours, the solvent and unreacted material were distilled, by heating to 180° C. under 150 mm. pressure. The brown resinous solid remaining was dissolved in dioxane and precipitated by pouring into a large volume of water. The copolymer was separated by filtration and dried.

Nine grams of this copolymer, 20.0 g. of a mixture of alcohols of composition "A" set forth hereinabove, 0.29 g. of conc. sulfuric acid, and 250 cc. of xylene were mixed and heated to reflux in a flask equipped with a side-arm water trap and a condenser. After heating for a total of 2 hours xylene was slowly distilled thereby raising the temperature to 160° C. The mixture was cooled, dissolved in xylene again, washed with hot water, and filtered. The solution was transferred to a distilling flask and the remaining xylene and unreacted alcohol were distilled by heating to 250° C. at 0.5 mm. pressure. The viscous polymer was readily soluble in lubricating oil.

EXAMPLE III

*Copolymer of allyl methyl ether with maleic anhydride-mixed alcohol ester thereof*

Sixteen and one-half grams of freshly distilled vinyl butyl ether, 16.5 grams of maleic anhydride, 1.2 grams of benzoyl peroxide and 160 cc. of toluene were mixed and heated to toluene reflux. The copolmer immediately began to precipitate. After heating for 1 hour, the mixture was cooled and the copolymer separated by filtering. It was washed with fresh toluene and dried.

Five grams of the above copolymer, 20.0 grams of an alcohol mixture of composition "A" described hereinabove, 0.2 gram of p-toluene sulfonic acid and 50 cc. of xylene were mixed and treated as in Example I to form the ester.

EXAMPLE IV

*Copolymer of allyl methyl ether with itaconic acid-mixed alcohol ester thereof*

Twenty-four grams of allyl methyl ether, 42.9 g. of itaconic acid, 2.01 g. of benzoyl peroxide, and 250 cc. of dioxane were mixed and slowly heated to reflux temperature (91° C.). During the reaction, the copolymer precipitated onto the sides of the flask. Refluxing was continued for a total of 11 hours. The liquid portion was decanted and the copolymer dissolved in acetone which was then evaporated on a steam bath.

Four and one-half grams of this copolymer, 10.0 g. of a mixture of alcohols of composition "A" set forth hereinbefore, 0.15 g. of conc. sulfuric acid, and 250 cc. of xylene were reacted as in Example II except that a reaction time of 4½ hours was used. The viscous polymer was readily soluble in lubricating oil.

EXAMPLE V

*Copolymer of vinyl isobutyl ether with maleic anhydride-mixed alcohol ester thereof*

Ten and two-tenths grams of vinyl isobutyl ether, 10.2 grams of maleic anhydride, 0.2 gram of benzoyl peroxide and 100 cc. of xylene were mixed and heated at xylene reflux for 1 hour. The precipitated copolymer was purified as in Example III.

Five grams of the above copolymer, 10.0 grams of the alcohol mixture "A" herein before mentioned, 0.1 gram of p-toluene sulfonic acid and 100 cc. of xylene were mixed and treated as in Example I to form the ester.

EXAMPLE VI

*Copolymer of allyl methyl ether with fumaric acid-mixed alcohol ester thereof*

Twenty-four grams of allyl methyl ether, 38.6 g. of fumaric acid, 1.90 g. of benzoyl peroxide, and 500 cc. of dioxane were mixed and slowly heated to reflux temperature (65° C.). After heating for 27 hours, the mixture was cooled and filtered to remove unreacted fumaric acid and the filtrate was allowed to drop into benzene to precipitate the copolymer. The copolymer was filtered, redissolved in acetone, and the acetone evaporated on a steam bath.

Fifteen grams of this copolymer, 30.0 g. of a mixture of alcohols of composition "A" set forth hereinbefore, 0.9 g. of p-toluene sulfonic acid, and 200 cc. of xylene were mixed and reacted as in Example II, except that the distillation was taken to 260° C. at 1.0 mm. pressure. The viscous product was readily soluble in lubricating oil.

EXAMPLE VII

*Copolymer of allyl mixed alcohol ether with maleic anhydride-mixed alcohol ester thereof*

Fifty grams of allyl alkyl ether prepared from allyl bromide and the sodium alcoholate of an alcohol mixture of the composition of alcohol mixture "A," described hereinbefore, 19.3 g. of maleic anhydride, 2.1 g. of benzoyl peroxide, and 200 cc. of xylene were mixed and heated slowly to xylene reflux, and the mixture held at this temperature for 7½ hours. The reaction mixture was cooled, transferred to a distilling flask, and the unreacted material and solvent were distilled by heating to 212° C. at 0.5 mm. pressure.

Ten grams of this copolymer, 12.3 g. of a mixture of alcohols of composition "A" set forth hereinbefore, 0.23 g. of p-toluene sulfonic acid, and 350 cc. of xylene were mixed and reacted as in Example II. The viscous product was readily soluble in lubricating oil.

EXAMPLE VIII

*Copolymer of vinyl octadecyl ether with maleic anhydride-mixed alcohol ester thereof*

Fifty grams of vinyl octadecyl ether, 17.0 grams of maleic anhydride, 0.67 gram of benzoyl peroxide and 150 cc. of toluene were mixed and slowly heated. At 80° C., a vigorous, exothermic reaction occurred causing violent reflux of the solvent. When the reaction had subsided, it was heated at gentle reflux for 1 hour. The clear viscous solution was diluted with more solvent and washed with hot water. The solvent was then removed by distillation, yielding a white resinous mass.

Fifteen grams of the above copolymer, 30.0 grams of alcohol mixture "A," 0.5 gram of p-toluene sulfonic acid and 200 cc. of xylene were mixed and treated as in Example I to form the ester. In this case, unreacted alcohol was removed by alcohol extraction instead of by vacuum distillation. The crude ester was extracted with 100 cc. of hot ethyl alcohol in which the unreacted alcohol is soluble. The residue was heated on a steam bath to remove entrained ethyl alcohol.

EXAMPLE IX

*Copolymer of allyl tetradecyl ether and maleic anhydride-mixed alcohol ester thereof*

Sixty-one grams of allyl tetradecyl ether prepared from allyl bromide and the sodium alcoholate of tetradecanol-1, 24.5 g. of maleic anhydride, and 0.85 g. of benzoyl peroxide were reacted as in Example VII.

Nineteen and two-tenths grams of this copolymer, 43.2 g. of a mixture of alcohols of composition "A" set forth hereinbefore, 1.24 g. of p-toluene sulfonic acid, and 200 cc. of xylene were mixed and reacted as in Example II, except that a final reflux temperature of 175° C. was attained. The viscous product was readily soluble in lubricating oil.

EXAMPLE X

*Copolymer of allyl mixed alcohol ether and maleic anhydride-tetradecyl ester thereof*

Fifty grams of allyl alkyl ether prepared as in Example VII, 38.6 g. of maleic anhydride, 2.4 g. of benzoyl peroxide and 200 cc. of xylene were mixed and heated to xylene reflux for 7½ hours. The reaction mixture was cooled, washed with hot water, filtered, and transferred to a distilling flask. The solvent and unreacted material were distilled by heating to 230° C. at 2.5 mm. pressure. The product was a dark, clear, resinous material.

Sixteen and two-tenths grams of this copolymer, 42.8 g. of tetradecanol-1, 1.2 g. of p-toluene sulfonic acid, and 250 cc. of xylene were mixed and reacted as in Example II except that a final reflux temperature of 170° C. was attained. The viscous product was readily soluble in lubricating oil.

EXAMPLE XI

*Copolymer of vinyl butyl ether with maleic anhydride-tetradecanol ester thereof*

Ten grams of the copolymer of maleic anhydride and vinyl butyl ether from Example III were dissolved in 100 cc. of acetone, and 25.0 grams of tetradecanol-1 were added. The solution was refluxed for ½ hour. Most of the acetone was then distilled from the reaction mixture after which 150 cc. of Sovasol 74, a high-boiling petroleum solvent containing 70% aromatics such as dimethyl and trimethyl benzene, and 0.5 gram of p-toluene sulfonic acid were added. The solution was heated at 150° C. for ½ hour after which the solvent was gradually distilled while raising the temperature to 175° C. This temperature was held about 3 hours. The residue was cooled, dissolved in benzene and filtered. The benzene was then distilled and the residue was extracted with 100 cc. of hot ethyl alcohol, as described in Example VIII, to obtain the finished product.

EXAMPLE XII

*Copolymer of allyl mixed alcohol ether, maleic anhydride and vinyl acetate-tech. lauryl ester thereof*

Sixty-four grams of allyl mixed alcohol ether, prepared as in Example VII, 49.0 g. of maleic anhydride, 25 g. of vinyl acetate, and 1.38 g. of benzoyl peroxide were mixed and slowly heated to 90° C. At this temperature the reaction became vigorous and the temperature rose to 145° C. in spite of external cooling. The reaction mixture was then cooled to 125° C. and held there for one hour. The reaction mixture was dissolved in dioxane, precipitated by pouring into water, redissolved in dioxane, and transferred to a distilling flask. The solvent and unreacted material were distilled by heating to 175° C. at 1 mm.

Ten grams of this copolymer, 32.0 g. of technical grade lauryl alcohol (Eastman), 0.84 g. of p-toluene sulfonic acid, and 200 cc. of xylene were reacted as in Example II except that the distillation was taken to 280° C. at 1 mm. The viscous product was readily soluble in lubricating oil.

The effectiveness of the reaction products prepared in accordance with the foregoing examples as pour point depressants for lubricating oils is illustrated by the data set forth in Table I. The results were obtained in a solvent refined Mid-Continent type oil stock having an A. S. T. M. pour point of +20° F.

TABLE I

| Compound Blended In Oil | Conc., Wt. Percent | A. S. T. M. Pour Point, ° F. |
|---|---|---|
| None | | +20 |
| Example I | 1.0 | −5 |
| Example II | 0.25 | +10 |
| Example III | 1.0 | −20 |
| Example III | 0.125 | −20 |
| Example III | 0.0625 | −5 |
| Example IV | 0.25 | −15 |
| Example V | 1.0 | −30 |
| Example V | 0.125 | 0 |
| Example VI | 0.25 | −25 |
| Example VI | 0.125 | −10 |
| Example VII | 0.25 | −30 |
| Example VII | 0.125 | −15 |
| Example IX | 0.25 | −20 |
| Example IX | 0.125 | −5 |
| Example X | 0.25 | −25 |
| Example X | 0.125 | −20 |
| Example XI | 0.125 | −20 |
| Example XI | 0.0625 | −20 |
| Example XII | 0.25 | −25 |
| Example XII | 0.125 | −20 |

The data in Table II illustrate the effectiveness of the reaction products contemplated herein as viscosity index improvers when blended in a lubricating oil. Two oils were used in these tests. Oil "A" was an acid-refined Mid-Continent type base oil having an original viscosity index of 76.3, while oil "B" was a similar type oil having an original viscosity index of 82.0.

TABLE II

| Compound Blend In Oil | Conc., Wt. Percent | Kinematic Viscosity | | |
|---|---|---|---|---|
| | | @ 100° F. | @ 210° F. | V. I. |
| None—Oil A | | 29.96 | 4.75 | 76.3 |
| Example II in oil A | 2.0 | 31.71 | 4.99 | 85.8 |
| Example XII in oil A | 2.0 | 32.42 | 5.10 | 90.1 |
| None—Oil B | 0.0 | 30.51 | 4.85 | 82.0 |
| Example VIII in oil B | 2.0 | 33.77 | 5.41 | 103.8 |
| Example XI in oil B | 2.0 | 34.19 | 5.36 | 97.8 |

Certain of the copolymers formed from the ethers and acids or acid anhydrides contemplated herein have been found to be oil-soluble and to function as pour point depressants without converting them to esters. This has been found to be true when the ether is derived from alcohols of relatively long chain length, i. e. about 10 to about 18 carbon atoms. For example, the copolymer of allyl mixed alcohol ether with maleic anhydride described in Example VII proved effective as a pour point depressant, 1.0% by weight in the above-mentioned test oil lowering the A. S. T. M. pour point to −25° F. However, 0.25% of this copolymer gave +10° F. pour point as compared to −30° F. pour point for the esterified copolymer (Example VII, Table I). Thus, it is seen that esterification of such a copolymer yields a more effective pour point depressant as well as furnishing a relatively neutral product.

Although, broadly, the invention contemplates the use of aliphatic alcohols having up to about 18 carbon atoms in preparing ethers of either the vinyl alkyl or allyl alkyl type for use in the copolymerization reaction, and aliphatic alcohols having up to about 18 carbon atoms for the final esterification of the copolymer product, it is preferred to utilize alcohols containing from about 10 to about 18 carbon atoms, i. e. an average of about 14 carbon atoms, in at least one of these reactions. In other words, it is preferred to use such an alcohol either in the preparation of the vinyl or allyl ether, or in the final esterification, or better still, to use such an alcohol in both steps. Such a preferred type of alcohol is represented, as hereinbefore indicated, by Eastman Kodak Company's technical grade lauryl alcohol or Du Pont Company's mixture of alcohols "A" and "B" as set forth hereinbefore.

The amount of reaction products contemplated herein to be used in the oil will vary with the particular oil and the magnitude of improvement desired. In general, the reaction products are used in amounts varying between about 0.01% and about 10% by weight. For use as a viscosity index improver, concentrations of from about 0.5% to about 10.0% by weight may be used. On the other hand, when the reaction products are employed as pour point depressants, smaller amounts of the addition agents are required, in which case concentrations between about 0.01% and about 2.0% by weight are sufficient.

Mineral oil concentrates are also contemplated by this invention, such concentrates containing substantially larger amounts of the addition agents than those above-mentioned. Thus, relatively large amounts, that is to say, from upwards of 10% to 49% by weight of the said materials may be incorporated in an oil fraction and the oil concentrates so obtained may thereafter be diluted with a suitable quantity of an oil prior to use to produce the desired optimum ultimate concentrations.

It is to be understood that the characterizing ingredients of the invention may be used in the oil in combination with other oil addition agents such, for example, as E. P. additives, oiliness agents, antioxidants, detergents, etc.

It is to be understood also that while I have herein described reaction products obtained with certain specific materials, and have illustrated exemplary methods of preparing such compounds, the invention is not limited to the specific compounds described or to the specific methods of preparation thereof, but includes such variations in reactants and procedures as come within the scope of the appended claims.

This application is a continuation-in-part of copending application, Serial No. 782,682, filed October 28, 1947, now abandoned.

I claim:

1. A mineral lubricating oil containing a minor proportion, sufficient to lower the pour point of said oil, of an esterified copolymer formed by copolymerizing (1) an ether selected from the group consisting of alkyl vinyl ethers and alkyl allyl ethers, the alkyl portion of said alkyl vinyl ether being an alkyl radical containing up to and including four carbon atoms and the alkyl portion of said alkyl allyl ether being a primary, normal, alkyl radical having from 1 to about 18 carbon atoms, with (2) an alpha, beta-unsaturated polycarboxylic acid material selected from the group consisting of maleic acid, fumaric acid, itaconic acid, glutaconic acid, mesaconic acid, citraconic acid, aconitic acid and the anhydrides of said acids, and esterifying the copolymer thus obtained with (3) an alcohol material, said alcohol material being selected from the group consisting of tetradecyl alcohol and a mixture of primary, normal, saturated alcohols having an average of about 14 carbon atoms per molecule when the ether utilized in preparing the copolymer is an alkyl vinyl ether and being a primary, normal, saturated alcohol having from 1 to about 18 carbon atoms when the ether utilized in preparing the copolymer is an alkyl allyl ether.

2. A mineral lubricating oil containing a minor proportion, sufficient to lower the pour point of said oil, of an esterified copolymer formed by copolymerizing (1) vinyl butyl ether with (2) maleic anhydride and esterifying the copolymer thus obtained with (3) tetradecyl alcohol.

3. A mineral lubricating oil containing a minor proportion, sufficient to lower the pour point of said oil, of an esterified copolymer formed by copolymerizing (1) allyl tetradecyl ether with (2) maleic anhydride and esterifying the copolymer thus obtained with (3) a mixture of primary, normal, saturated aliphatic alcohols having an average of about 14 carbon atoms per molecule.

4. A mineral lubricating oil containing a minor proportion, sufficient to lower the pour point of said oil, of an esterified copolymer formed by copolymerizing (1) an alkyl allyl ether, the alkyl portion of said ether having been derived from a mixture of primary, normal, saturated, aliphatic alcohols having an average of about 14 carbon atoms per molecule, with (2) an alpha, beta-unsaturated polycarboxylic acid material selected from the group consisting of maleic acid, fumaric acid, itaconic acid, glutaconic acid, mesaconic acid, citraconic acid, aconitic acid and the anhydrides of said acids, and esterifying the copolymer thus obtained with (3) a mixture of primary, normal, saturated, aliphatic alcohols containing an average of about 14 carbon atoms per molecule.

5. A mineral lubricating oil containing a minor proportion, sufficient to lower the pour point of said oil, of an esterified copolymer formed by copolymerizing (1) an alkyl allyl ether, the alkyl portion of said ether having been derived from a mixture of primary, normal, saturated, aliphatic alcohols having an average of about 14 carbon atoms per molecule with (2) maleic anhydride, and esterifying the copolymer thus obtained with (3) a mixture of primary, normal, saturated, aliphatic alcohols having an average of about 14 carbon atoms per molecule.

6. A mineral lubricating oil containing a minor proportion, sufficient to lower the pour point of said oil, of an esterified copolymer formed by copolymerizing (1) an alkyl allyl ether, the alkyl portion of said ether having been derived from a mixture of primary, normal, saturated, aliphatic alcohols having an average of about 14 carbon atoms per molecule with (2) maleic anhydride, and esterifying the copolymer thus obtained with (3) tetradecyl alcohol.

7. A mineral lubricating oil containing a minor proportion, sufficient to lower the pour point of said oil, of an esterified copolymer formed by copolymerizing (1) vinyl isobutyl ether with (2) maleic anhydride, and esterifying the copolymer thus obtained with (3) a mixture of primary, normal, saturated, aliphatic alcohols having an average of about 14 carbon atoms per molecule.

References Cited in the file of this patent

UNITED STATES PATENTS

| Number | Name | Date |
|---|---|---|
| 2,047,398 | Voss | July 14, 1936 |
| 2,342,113 | Blair | Feb. 22, 1944 |
| 2,370,943 | Dietrich | Mar. 6, 1945 |
| 2,415,400 | Armstrong | Feb. 11, 1947 |
| 2,422,881 | Blair | June 24, 1947 |
| 2,454,284 | Kirk | Nov. 23, 1948 |
| 2,615,845 | Lippincott et al. | Oct. 28, 1952 |
| 2,677,662 | Mikeska | May 4, 1954 |